United States Patent Office 3,437,254
Patented Apr. 8, 1969

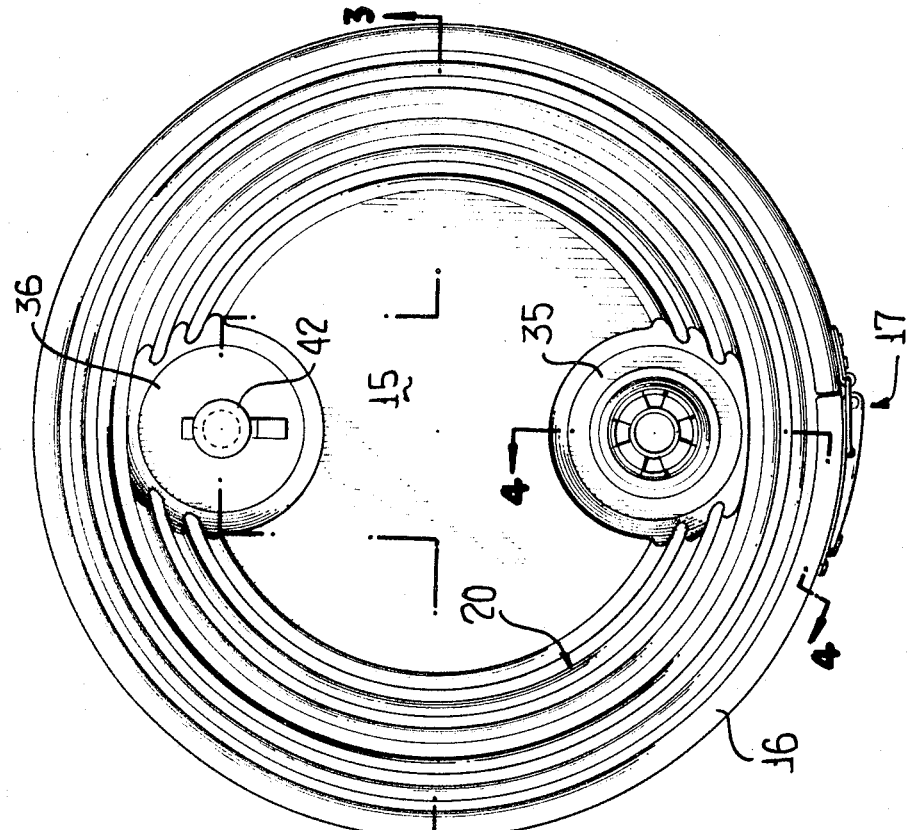
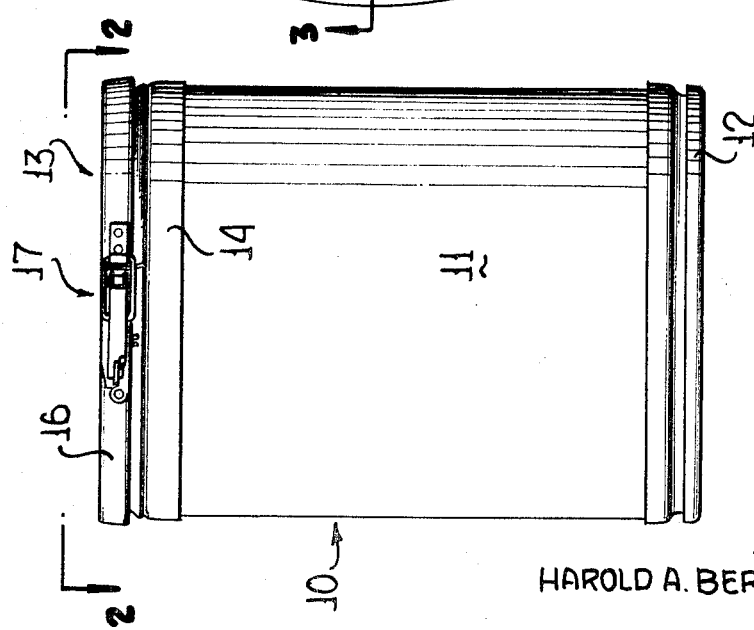

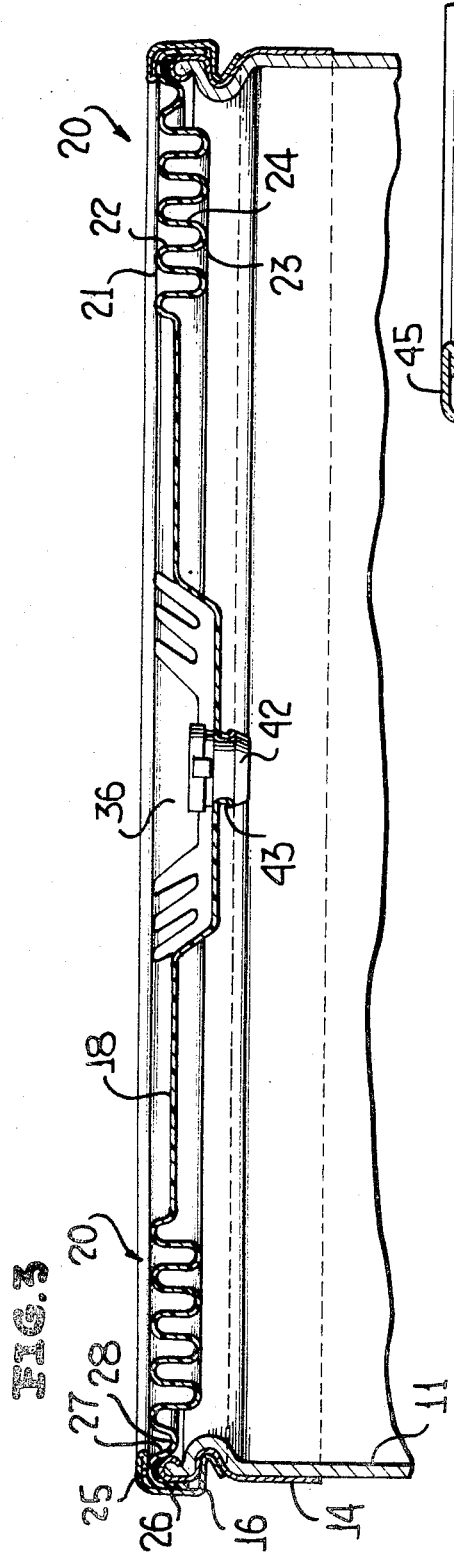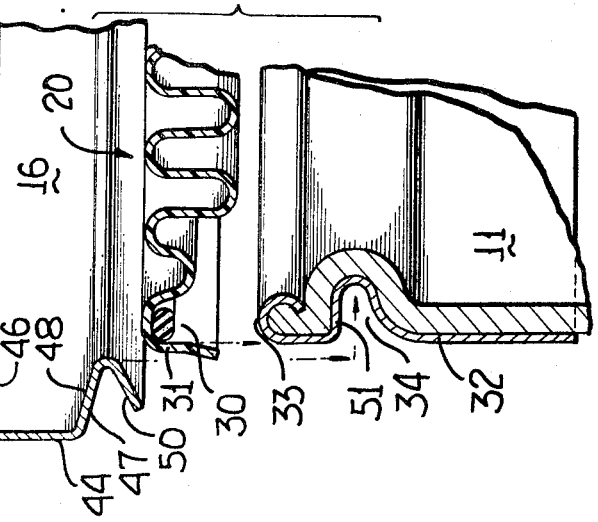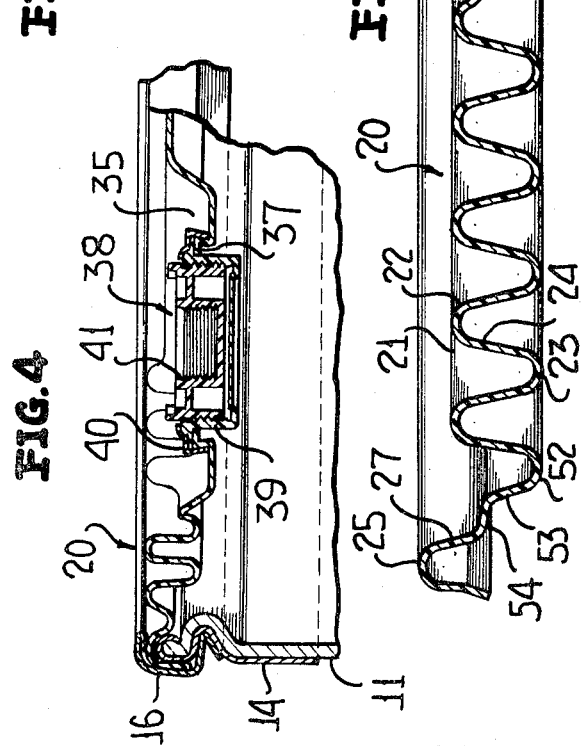

3,437,254
CONTAINER AND COVER ASSEMBLY
THEREFOR
Harold A. Bergstrom, Sarasota, Fla., assignor to Continental Can Company, Inc., New York, N.Y., a corporation of New York
Filed Aug. 14, 1967, Ser. No. 660,319
Int. Cl. B65d 3/10, 5/64, 47/32
U.S. Cl. 229—5.7                                    15 Claims

ABSTRACT OF THE DISCLOSURE

A fibreboard drum having a plastic closure member including a series of concentric circular beads which increase the surface area of the closure member and absorb forces applied to the periphery thereof. The plastic closure member includes depressed pocket areas having vents or dispensing fittings situated therein in reinforcing contact with the plastic closure member. A locking band maintains the closure member upon the drum and is especially adapted for ease of application of the closure member to the drum.

---

This invention relates generally to containers employed for shipping, storing or dispensing liquids, powders and dry or semi-solid articles, and more particularly to a container and cover combination that may be employed for such purposes.

In the past drum-type containers have been provided with metallic closure members or covers. Such metallic closure members suffered from the disadvantages of high manufacturing cost and lack of resistance to the corrosive effects resulting from the disclosure of certain classes of commodities within the containers to which such metal covers or closure members were applied. It has become common practice to provide a separate film or sheet of non-corrosive material within drum-type containers immediately adjacent the metal cover thereof to segregate corrosion-inducing substances from the inner surface of the metal cover. The provision of a separate film or sheet of corrosion resistant material within the container further increases packaging costs and adds to the complexity of the packaging procedure and corrosive fumes, such as chlorine, will slowly permeate through such a film and corrode a metal cover. Additionally, metal closure members of the same general dimensions having differing end panel configurations require substantially differing manufacturing procedures.

Attempts have been made to provide plastic coverings or closure members for drum-type containers. However, certain difficulties have been encountered in the utilization of such plastic closure members. For example, such containers must be capable of withstanding, in their fully loaded condition, the application of abrupt forces, such as those encountered by dropping, without any resulting leakage therefrom.

Prior attempts to utilize plastic closure members affixed to the container body wall by means of known locking band arrangements have met with little success. Upon the application of an abrupt force to the cover chime or locking band area of the container, the locking band and upper container portion would assume an elliptical configuration thereby placing the closure member in tension along the major axis of such elliptical configuration. The failure of the plastic closure member to assume an elliptical configuration in conformance with the locking band and upper container body portion has, until now, resulted in the pulling loose of the closure member from the locking band and the separation of the closure member from the locking band has been extremely difficult to overcome due to the relatively slippery nature of the plastic material from which such closure members have been formed.

Another deficiency previously attributable to the utilization of plastic closure members for drum-type containers has been the unsuitability of such closure members for the provision of standard dispensing fittings and vents. The formation of openings in plastic covers or closure members has characteristically resulted in the weakening of such members adjacent the openings provided therein. Further, the relatively slippery nature of the plastic employed in such members has rendered it extremely difficult to provide known dispensing fittings having threaded screw-in plug portions. The threaded female member of such a fitting is attached to the end panel portion of the closure member and, upon the application of a turning force of the male threaded portion of the fitting, the female portion of the fitting has, typically, rotated with respect to the container closure member.

The inherent flexible nature of plastic closure members has, in prior attetmpts to provide drum-type containers with such closure members, resulted in a great deal of difficulty in the application of previously known locking band arrangement inasmuch as flexure resulting from the application of the locking band has tended to warp the plastic closure member with a resultant loss of contact between the outer periphery of the closure member and the extremity of the container body wall.

In accordance with the foregoing, it is a primary object of this invention to provide an improved plastic closure member suitable for application to a container.

Additionally, it is an object of this invention to provide an improved container-plastic closure member combination.

Further, it is an object of this invention to provide a locking band suitable for easily locking a plastic closure member to a container body wall.

Still another object of this invention is to provide a plastic closure member having shock-absorbent corrugations formed therein suitable to absorb abrupt forces applied to the periphery of the closure member while allowing the closure member to assume a configuration dictated by container distortion.

Yet another object of this invention is to provide a plastic closure member having dispensing fittings and/or vent assemblies firmly attached thereto in reinforcing relationship to the plastic closure member.

With the above and other objects in view that will hereinafter appear, the nature of the invention will be more clearly understood by reference to the following detailed description, the appended claims, and the several views illustrated in the accompanying drawings.

IN THE DRAWINGS

FIGURE 1 is an elevational view illustrating a container incorporating the invention, and shows a drum-type container with a closure member and locking band in place thereon.

FIGURE 2 is an enlarged top plan view taken along the line 2—2 of FIGURE 1 and shows the plastic closure member and locking band in position upon the container.

FIGURE 3 is an enlarged fragmentary sectional view taken along the line 3—3 of FIGURE 2, and shows the plastic closure member, the locking band affixed to the container side wall and a vent fitting in an opening in the closure member.

FIGURE 4 is an enlarged fragmentary sectional view taken along the line 4—4 of FIGURE 2, and shows a plastic closure member having a bung or dispensing fitting situated in a depression formed therein.

FIGURE 5 is an exploded fragmentary sectional view of the locking band, plastic closure member and container side wall, and shows a metal chime situated upon the container side wall.

FIGURE 6 is a fragmentary sectional view showing an alternate embodiment of the shock absorbing corrugations formed in the plastic closure member.

Referring to the drawings in detail, indicated generally at 10 is a drum-type container having a body 11 constructed of fibreboard or other suitable material. The container 10 terminates at the bottom thereof in a suitable bottom closure member 12. A closure assembly, generally indicated by the numeral 13, is situated upon a metallic ring-like chime 14 provided upon the upper extremity of the body member 11.

The closure assembly 13 includes a plastic closure member or cover 15 and a lever actuated locking band 16. The locking band 16 may be provided with any of a number of suitable locking mechanisms, such as that generally indicated by the numeral 17. The plastic closure member 15 may be molded from a thermo-formable plastic such as, for example, high density polyethylene. The closure member 15 includes a centrally located end panel including a plateau or planar portion 18 surrounded by a shock absorbing corrugated area, generally indicated by the numeral 20. The generally annular corrugated portion 20 of the closure member 15 includes a number of interconnected ribs or beads 21 defining a plurality of lands 22 and valleys 23 interconnected by a plurality of bight portions 24. The outer periphery of the closure member 15 is defined by a curl portion 25 having a downwardly depending peripheral skirt 26 and a chuck wall portion 27 connected to the outermost of the ribs 21 at a radius 28. The curl 25 defines a downwardly opening peripheral channel 30 in which is situated a deformable resilient gasket 31. The resilient gasket 31 is positioned within the channel 30 for sealing engagement with a ring-like metallic chime 32 at an uppermost bead portion 33 thereof. The chime or chime ring 32 is provided with a generally horizontal inwardly extending flange portion 34, suitable for cooperation with the locking band 16, as will be set forth in further detail hereinafter.

The plastic cover 15 has formed therein a pair of pockets or recesses 35, 36. An annular clamping ring or flange 37 is provided in the pocket or recess 35 to accommodate a bung or dispensing fitting generally indicated by the numeral 38. As shown in FIGURE 4, the clamping flange or clamping ring 37 is integrally formed from the material of the recess 35 and lies generally in a radially disposed plane removed from the axially innermost plane or bottom of the recess 35. The annular clamping ring 37 may be dimensioned to accommodate any of a number of suitable fittings. As illustrated, the dispensing fitting 38 includes a threaded, plastic female ring 39 inserted in the accommodating opening (unnumbered) provided in the clamping ring 37. An outer retainer ring or bushing 40 maintains the annular clamping ring 37 tightly captive between the retainer ring 40 and the plastic female ring 39. A threaded, centrally located male plug 41 completes the bung or dispensing fitting 38.

Specifically, the threaded, male plug member 41 is firmly maintained within the female ring member 39 upon rotation of the male plug member 41 to its limited travel within this female member 39. Appreciable rotational forces are applied to the male plug member 41 upon closure of the bung or dispensing fitting assembly 38 and, likewise, upon the "cracking loose" of the male member 41 during the opening of the dispensing fitting 38. Such relatively large rotational forces would otherwise cause the bung or dispensing fitting 38 to rotate with respect to the annular clamping ring 37, thus making it impossible to remove the male member 41 without removal of the entire bung or dispensing fitting 38 were it not for the particular structure set forth hereinafter. Furthermore, a general weakening of the plastic closure member 15 adjacent the annular clamp ring 37 results from the formation of the opening through the clamping ring 37.

The width of annular clamping ring 37 is selected to provide a tight engagement with the retainer ring 40 and the female threaded member 39. Thus, when the dispensing fitting 38 is positioned upon annular clamping ring 37, such annular clamping ring is displaced inwardly and held firmly between retainer ring 40 and female member 39. The tight engagement of the retainer ring 40 and the female ring member 39 with the annular clamping ring 37 allows considerable rotational forces to be applied to the plug member 41 without a resulting rotation of the female member 39 with respect to the annular clamping ring 37. Furthermore, such tight engagement between the annular clamping ring 37 and the dispensing fitting 38 provides structural reinforcement to the plastic closure member 15 in the area of the pocket or recess 35.

The pocket or recess 36 may be provided with an additional bung or dispensing fitting similar to the bung 38. As shown, the pocket or recess 36 is provided with a suitable vent fitting or vent, best seen in FIGURE 3. The opening (unnumbered) formed in the recessed area 36 of the plastic closure member 15 has a diameter somewhat smaller than the outside diameter of vent 42. Thus, upon insertion of the vent 42, the plastic material immediately adjacent the outside diameter of the vent 42 is displaced downwardly to form a flange 43. The plastic closure member 15 is thus reinforced in the area adjacent the vent 42 and this vent is firmly held in place due to the grasping effect of the downwardly projecting flange portion 43.

The locking band 16 comprises a generally vertically disposed depending body portion 44 engageable against the downwardly projecting skirt portion 26 of the plastic closure member 15. An upper horizontal flange 45 terminating in a reverse bend or hem portion 46 is provided upon the locking band 16 to overlie the curl portion 25 of the plastic closure member 15. A second inwardly directed flange portion 47 having a generally downwardly sloping camming surface 48 and terminating in a reversely bent outwardly projecting flange portion 50 is provided for positioning in the groove 34 of the chime 32. Upon application of the locking band 16 to the container 10 the camming surface 48 acts upon a downwardly facing shoulder 51 of the chime 32. The provision of the downwardly sloping camming surface 48 insures a relatively gradual exertion of force upon the curl portion 27 of the closure member 15 upon contraction of the locking band 16 about the uppermost portion of the container 10. The utilization of the downwardly sloping camming surface 48 alleviates buckling and distortion in the plastic closure member 15. Thus, the difficulties previously encountered upon the application of conventional locking bands to containers utilizing plastic closure members are overcome.

It is to be noted that the desired gradual application of force to the curl portion 27 of the plastic closure member 15 may be accomplished through the prevision of a camming surface, similar to the camming surface 48, upon the lower face of the upper flange 45. When a camming surface is provided upon the upper flange 45 the lower inwardly projecting flange portion 47 may be generally horizontally disposed.

An alternative embodiment of the corrugated area 20 is shown in FIGURE 6 wherein, it will be noted, the portion of the plastic closure member 15 lying radially inwardly with respect to the outer curl 25 is disposed downwardly with respect to the plane in which such curl portion lies. The outermost valley 52 is connected to the depending chuck wall portion 27 of the curl 25 via an outermost bight portion 53 and an interconnecting plateau portion 54. The depression of the central area of the closure member 15, including the corrugated area 20, relieves the plastic closure member 15 from abuse often encountered in the stacking and handling of drum-type containers.

The application of abrupt forces to the uppermost chime portion of the container 10 having a closure member 15 as seen in either FIGURE 4 or FIGURE 6 results in the absorbing of such forces by the shock absorbent corrugated portion 20 adjacent the area of impact and radial expansion and compression of the corrugated portion to allow the closure member 15 to conform to distortion of the container and locking band. Thus, the plastic closure member 15 does not, upon the application of such abrupt peripheral forces, resist the distortion of the upper container portion into an elliptical configuration but, rather, the corrugated portion 20 of the closure member allows the closure member to conform to such elliptical configuration. The expansion and compression of the corrugated portion 20 greatly reduces the tendency of the curl portion 25 to slip out from beneath the locking band 16 upon the dropping or other mishandling of the container 10.

It will be noted that the uppermost portions of the lands 22 and the lowermost portions of the valleys 23 lie in generally parallel horizontal planes spaced a substantial distance from one another with respect to the thickness of the plastic closure member. The spacing between these generally parallel planes determines the force which may safely be applied to the periphery of the container as by the dropping thereof. In practice, an approximate 20% or more increase in the surface distance across the plastic closure member 15, measured through its center, is effected with respect to the coresponding straight line distance or diameter thereacross, by the inclusion of the corrugated portion 20. Such increase in surface distance results in a plastic closure member suitable to meet extremes of shipping and handling abuse.

I claim:

1. A plastic closure member for drums or like containers comprising a peripheral curl portion adapted for seating upon a container body, radially expansible and contractible shock absorbent corrugation means inwardly disposed adjacent said curl portion for absorbing generally radially directed forces applied to said curl portion and for allowing distortion of said closure member in response to said forces, said corrugation means comprising a plurality of ribs including upwardly disposed land portions and downwardly disposed valley portions, said land portions lying in a first plane and said valley portions lying in a second plane well removed from said first plane to assure the radial expansion and compression of said corrugation means upon application of said forces, said land and valley portions being interconnected by steeply inclined bight portions, movably hinged at said land and valley portions for accordion-like compression and expansion.

2. A plastic closure member according to claim 1 wherein said corrugated area increases the surface distance across said closure member through the center thereof at least approximately 20% with respect to the corresponding straight line distance across said closure member.

3. A plastic closure member for drums or like containers comprising a peripheral curl portion adapted for attachment to a container body, radially compressible corrugation means for absorbing forces applied to the periphery of said closure member, said corrugation means comprising a plurality of concentric ribs, the outermost rib thereof being adjacent and attached to said curl portion, said ribs defining upper lands and lower valleys lying in planes spaced well apart, said curl portion further including a downwardly depending peripheral skirt and a chuck wall, said upper lands being substantially coplanar with the uppermost portion of said curl portion and said lower valleys lying in a plane disposed below the lowermost portion of said chuck wall.

4. A plastic closure member for drums or like container comprising a peripheral curl portion adapted for attachment to a container body, radially compressible corrugation means for absorbing forces applied to the periphery of said closure member, said corrugation means comprising a plurality of concentric ribs, the outermost rib thereof being adjacent and attached to said curl portion, said ribs defining upper lands and lower valleys lying in planes spaced well apart, said curl portion further including a downwardly depending peripheral skirt and a chuck wall, said upper lands lying in a plane lower than the uppermost portion of said curl and said lower valleys lying in a plane well removed from said lands to assure radial expansion and compression of said corrugation means upon application of said forces.

5. A plastic closure member for drums or like containers comprising a peripheral curl portion adapted for attachment to a container body, a centrally located end panel and a recessed pocket having an annular clamping flange formed from the plastic of said pocket and having an opening formed therethrough defined by said flange, a dispensing fitting situated in said opening having a plastic female member disposed within said opening and a retainer overlying said flange, said flange being tightly maintained captive between said female member and said retainer to prevent slippage of said dispensing fitting with respect to said flange and to reinforce said closure member in the area adjacent said opening.

6. A plastic closure member for drums or like containers comprising a peripheral portion adapted for attachment to a container body, said closure member having a generally radially disposed clamping flange located radially inwardly from said peripheral portion and defining an opening therethrough, a dispensing fitting in said opening in reinforcing relationship to the area of said closure member adjacent said opening, said dispensing fitting having a member extending through said opening and a retainer overlying said flange, said retainer and said member firmly holding said flange captive therebetween, said retainer forcing said flange inwardly toward said member extending through said opening to tightly engage said flange with said member extending through said opening.

7. A plastic closure member for drums or like containers comprising a peripheral curl portion adapted for attachment to a container body, a central located end panel and a recessed pocket having an opening formed therethrough, a plastic vent fitting extending through said opening in reinforcing relationship to the area of said closure member adjacent said opening, said opening being normally smaller than the exterior of said vent fitting, and a flange member defined by the portion of said closure member material displaced by the insertion of said vent fitting.

8. A plastic closure member for drums or like containers, comprising a peripheral portion adapted for attachment to a container body and having an opening therethrough disposed radially inwardly with respect to said peripheral portion, a vent fitting firmly held within said opening, a flange portion in firm engagement with said vent fitting, said vent fitting being in reinforcing relationship with the area of said closure member adjacent said opening, said opening being normally smaller than the portion of said vent fitting therein, and said flange comprising that portion of closure member material displaced by the insertion of said vent fitting.

9. In a drum or like container combination having a container body terminating in a closure facilitating chime ring, a plastic closure member situated on the chime ring and a locking band interconnecting the plastic closure member and chime ring; a peripheral curl portion on said plastic closure member, said curl portion defining a channel and a peripheral skirt, said chime ring having an uppermost portion thereof situated in said channel and a radially inwardly extending groove, said locking band having a radially inwardly extending first flange overlying said curl portion and in contact therewith, a depending body portion disposed radially outwardly from said skirt and an inwardly directed, downwardly sloping second flange located in said groove, said second flange having formed thereon camming surface means for camming said locking band and plastic closure member firmly into contact with said chime ring upon the application of said locking band to said chime ring and closure member.

10. In a drum or like container combination including a container body, a plastic closure member situated on the container body and a locking band interconnecting the plastic closure member and the container body, a peripheral curl portion on said plastic closure member, said curl portion defining a channel, said container body terminating in closure facilitating means, the terminal porton of said closure facilitating means being received in said channel, said locking band comprising first and second radially inwardly projecting flange portions and a body portion interconnecting said flange portions, at least one of said first and second flange portions defining camming surface means for camming said locking band and plastic closure member firmly into place upon said container body upon application of said locking band to said chime ring and closure ring.

11. The combination as claimed in claim 10 wherein said channel has seated therein a resilient gasket in sealing engagement between said closure member and said terminal portion of said closure facilitating means.

12. A locking band for drums or like containers particularly adapted for the attachment of flexible closure members to a container body and comprising first and second generally radially inwardly extending flange portions, and an interconnecting body portion, one of said first and second flange portions having an inclined cammig surface means formed thereon for contacting one of the container body and closure member for camming the flexible closure member into firm engagement with the container body upon application of the locking band to said member, said camming surface means extending radially inwardly away from said body portion and being inclined axially away from said body portion, the distance between said flange portions decreasing adjacent said body portion, whereby a closure member and container end portion disposed between said flange portions are cammed together upon application of said locking band.

13. A drum or like container comprising a container body, a plastic closure member having a peripheral curl portion defining a channel, said channel accommodating a terminal portion of the closure member and a locking band interconnecting said plastic closure member and said container body, said plastic closure member having shock absorbent corrugation means formed therein adjacent said curl portion for axially expanding and compressing upon the application of forces to said container at or adjacent said locking band, said corrugation means absorbing such forces and allowing radial extension of said closure member in conformance with container distortion upon the application of said forces, said plastic closure member further having an opening formed therethrough and fitting means within said openng in tghtly held reinforcing relationship with said plastic closure member.

14. A drum or like container according to claim 13 wherein said corrugation means and fitting means are disposed axially below the plane within which the uppermost portion of said curl portion lies.

15. A drum or like container according to claim 13 wherein said container body is of fiber board construction terminating in a closure and locking ring accommodating metallic chime ring.

References Cited

UNITED STATES PATENTS

| | | | |
|---|---|---|---|
| 1,913,652 | 6/1933 | Alexander | 220—66 |
| 3,019,956 | 2/1962 | Muhlhoff | 229—5.7 |
| 3,054,548 | 9/1962 | Scott | 229—5.7 |
| 3,057,537 | 10/1962 | Pollick | 220—66 X |

FOREIGN PATENTS 1,119,542  4/1956  France.

DAVID M. BOCKENEK, *Primary Examiner.*

U.S. Cl. X.R.

215—96; 220—70; 229—43